United States Patent [19]

Schurb

[11] Patent Number: 5,496,601
[45] Date of Patent: Mar. 5, 1996

[54] EXTENSIBLE FLATBACK ADHESIVE SHEET

[75] Inventor: Francis A. Schurb, St. Paul, Minn.

[73] Assignee: Minnesota Mining and Manufacturing Company, St. Paul, Minn.

[21] Appl. No.: 195,873

[22] Filed: Feb. 14, 1994

[51] Int. Cl.$^6$ ....................................................... C09J 7/02
[52] U.S. Cl. .......................... 428/40; 427/208.4; 427/282; 428/343; 428/354
[58] Field of Search ................................ 428/40, 42, 343, 428/354, 355

[56] References Cited

U.S. PATENT DOCUMENTS

| | | | |
|---|---|---|---|
| 2,214,006 | 5/1934 | Ziegler et al. | 154/33 |
| 2,410,078 | 10/1946 | Kellgren | 117/155 |
| 2,624,245 | 1/1953 | Cluett | 92/68 |
| 2,941,661 | 6/1960 | Picard | 206/59 |
| 3,011,545 | 12/1961 | Welsh | 162/361 |
| 3,104,197 | 9/1963 | Back | 162/113 |
| 3,329,556 | 7/1967 | McFalls et al. | 161/170 |
| 3,359,156 | 12/1967 | Freuler et al. | 162/361 |
| 3,503,495 | 3/1970 | Gustafson et al. | 206/59 |
| 3,630,837 | 12/1971 | Freuler | 162/36 |
| 3,677,788 | 7/1972 | Zimite | 117/11 |
| 4,329,394 | 5/1982 | Hanke | 428/342 |
| 4,551,199 | 11/1985 | Weldon | 162/109 |
| 4,637,859 | 1/1987 | Trokhan | 162/109 |
| 4,834,838 | 5/1989 | Klowak | 162/109 |
| 4,849,278 | 7/1989 | Stokes | 428/153 |
| 5,209,973 | 5/1993 | Wille et al. | 428/352 |

FOREIGN PATENT DOCUMENTS

| | | | |
|---|---|---|---|
| 1195562 | 10/1985 | Canada | 117/208 |
| 2000365 | 10/1989 | Canada . | |

OTHER PUBLICATIONS

Patent Abstracts of Japan, vol. 014, No. 399, Aug. 29, 1990 & JP,A,02 151427, Jun. 11, 1990.
D21H 5/24 Mar. 4, 1978 Germany.

*Primary Examiner*—Jenna L. Davis
*Attorney, Agent, or Firm*—Gary L. Griswold; Walter N. Kim; Christine T. O'Shaughnessy

[57] ABSTRACT

The present invention provides an adhesive sheet that is extensible and conformable. The sheet comprises a non-creped flatback paper backing comprising cellulosic fibers and an elastomeric saturant and having an elongation at break of at least 8%; and an adhesive coating on at least a portion of at least one major surface of said backing. No mechanical means is used to generate extensibility or conformability in the backing of the adhesive sheet of the invention. The adhesive sheet combines all the advantages of a smooth flatback tape and the extensibility and conformability of a creped or microcreped tape.

16 Claims, No Drawings

EXTENSIBLE FLATBACK ADHESIVE SHEET

FIELD OF THE INVENTION

This invention relates to an adhesive sheet or assembly that is extensible and conformable. Such a sheet or assembly is useful in applications where stiffness is a concern, for example, in masking irregular or curved surfaces.

BACKGROUND OF THE INVENTION

Paper backings are conventionally used in many pressure sensitive adhesive tapes. The paper may be impregnated with a material which is capable of binding the paper fibers together to increase the tensile strength of the paper, thereby reducing the tendency of the tape to split or delaminate. A pressure sensitive adhesive is typically applied to one side of the paper sheet while a release coating is typically applied to the opposite side. A barrier layer may be applied to one side of the paper as a base for the release coating, and a primer may optionally be applied to the other side of the paper to help adhere the adhesive. The coated sheet is then wound and cut into rolls to form an adhesive tape.

In many applications, it is important that the tape be extensible and conformable with minimum tape stiffness. For example, a tape used to mask curved and irregularly shaped surfaces preferably conforms closely to such surfaces without tearing. In addition to being extensible and conformable, it is preferable that such tapes have relatively smooth surfaces so as to minimize the amount of adhesive and release coating required to cover the surfaces, and to minimize seepage (for example, of paint) under the edge of the masking tape. It is also desirable that the tape be as thin as possible to provide an improved paint edge.

Extensibility and conformability in tapes have traditionally been achieved by mechanically creping the paper used in the tape backing using a creping blade to impart ridges to the paper web either before or after saturant is applied. See, for example, U.S. Pat. No. 2,214,006 (Ziegler). The degree of extensibility can be further controlled by adding a rubber-resin saturant to bind the fibers of the creped backing and varying the degree of vulcanization. See, for example, U.S. Pat. No. 2,410,078 (Kellgren).

The creping process and the use of a creped backing have several disadvantages associated therewith. One disadvantage is that the creping process is difficult to control due to wearing of the creping blade and variations in the angle of blade used. This presents problems in maintaining product uniformity and productivity. Additionally, the degree and uniformity of the crepe is highly dependent on the moisture content of the paper web, which may be difficult to control.

The creped, saturated backing also requires more adhesive and barrier or release coating to fill in the valleys resulting from the creping process. In addition, the creped backing imparts a crepe image on the adhesive surface when the tape is provided in roll form, reducing the adhesive effectiveness. Finally, the creped backing may cause irritation to the applicator's fingers with prolonged use.

In contrast, a smooth backing requires less adhesive coating. In addition, the adhesive can be coated more uniformly as a continuous coating onto a smooth backing. This results in improved adhesion properties when compared to comparable tapes comprising creped backing. For masking applications, a smooth backing gives an improved paint edge because the adhesive can be coated more uniformly onto a smoother surface, and the adhesive surface becomes less disrupted in roll form.

To overcome the problems associated with a creped backing, several attempts have been made to either smooth out the creped surface with additional mechanical means, or to increase the frequency of crepe lines to impart a "fine" crepe or microcrepe texture that still gives sufficient extensibility and conformability for masking applications.

U.S. Pat. No. 2,941,661 (Picard) describes an impregnated and unified creped paper backing having a superfine crepe structure. The creping procedure comprises the steps of subjecting a freshly formed paper web to superfine creping on a steel wet press roll using a steel creping blade which imparts at least about 40 crepe lines per lineal inch (15.7 lines per lineal cm) and calendering to reduce thickness and impart a higher degree of smoothness. This compares to a conventional creped backing used in masking tapes which has about 15 to 30 crepe lines per lineal inch (5.9 to 11.8 lines per lineal cm). Picard further discloses a fine creped paper having closely spaced rounded crepe ridges on one side and a number of very small cup and pocket-like indentations on the other. U.S. Pat. No. 4,849,278 (Stokes) describes a flexible paper web particularly useful as label stock for flexible, squeezable containers made by applying a fine crepe pattern to a paper substrate, saturating the substrate with a soft polymer saturant at about 15 to 75 parts by weight of saturant per 100 parts of fiber weight, and calendering the web to improve the surface smoothness to improve printability. Although the methods of Picard and Stokes both result in paper backings that are significantly smoother than conventional creped backings, the processes still rely on a creping blade to achieve the fine creped pattern. Thus, many of the difficulties associated with such processes (for example, blade wear, critical moisture content of the web, and non-uniform crepe surfaces) remain.

Several attempts have been made to manufacture an extensible paper backing that does not rely on a creping blade. Generally, a compressive force is applied to the paper web in a direction parallel to the face surfaces of the web while simultaneously applying pressure perpendicular to said face surfaces. The pressure is applied by passing the web between rollers operating at different speeds. The compression in the machine direction results in a substantial decrease in the length of the paper, while the pressure perpendicular to the web surface maintains high sheet density. Although this process does not employ a creping blade and papers made by this process are often referred to as "uncreped", a mechanical means is still employed to impart fine, closely spaced ridges in the paper backing to give extensibility and conformability. As a result, these backings are "creped" for purposes of the present invention. As with the creping process, the moisture content of the web is still critical to maintain product uniformity. Mechanisms employed for obtaining the compressed paper web are described in several prior patents.

U.S. Pat. No. 2,624,245 (Cluett), for example, describes a process for the manufacture of an "uncreped" extensible paper whereby a sufficiently moist paper web is subjected to compression in a direction parallel to the surfaces of the web, while the paper is under considerable pressure perpendicular to its surface to restrain it from creping. During this process, the fibers of the web are distorted and crowded together, without thickening of the web. Other mechanical techniques for producing an extensible paper are described in U.S. Pat. No. 3,011,545 (Welsh); U.S. Pat. No. 3,329,556 (McFalls); U.S. Pat. No. 3,359,156 (Freuler); and U.S. Pat. No. 3,630,837 (Freuler); U.S. Pat. No. 3,104,197 (Back);

U.S. Pat. No. 4,637,859 (Trokhan); U.S. Pat. No. 3,503,495 (Gustafson); U.S. Pat. No. 4,551,199 (Weldon); U.S. Pat. No. 4,834,838 (Klowak); and U.S. Pat. No. 5,209,973 (Romanus Wille).

Flatback or smooth papers are commercially available. A flatback paper is one in which, once the fiber mat has been formed, it is not mechanically disturbed to generate extensibility or conformability. Flatback papers, however, are not typically employed in applications where extensibility and conformability are required as they typically exhibit elongation at break values of from about 2 to about 3%.

Various attempts have been made to increase the extensibility of flatback papers. For example, vinylcontaining fibers (e.g., polyvinyl alcohol or polyvinyl chloride fibers) have been incorporated into the fiber mat. It is believed that the vinyl fibers are bonded to the cellulosic fibers in the mat by passing the mat through a heated nip. Even with the addition of the vinyl fibers, however, the extensibility of the paper is only minimally increased.

A commercially available flatback tape that incorporates vinyl fibers in the paper backing, Scotch Brand Masking Tape for Sealing Applications, is available from Sumitomo 3M. The backing is saturated with styrene-butadiene/acrylate saturant. This tape is said to have an elongation at break of 7%, which is not considered to provide adequate extensibilty for masking intricate configurations. The tape is marketed for linear masking tape applications.

Other flatback tapes are known that have an elongation at break of 7–8%. These tapes also utilize a styrene-butadiene acrylate saturant. Again, however, these tapes are not considered to provide adequate extensibility for masking intricate configurations.

Thus, a need still exists for an adhesive tape that has a smooth, uncreped flatback paper backing having a high degree of extensibility and conformability where no mechanical means has been used to generate these properties in the backing. Eliminating the mechanical means for generating extensibility and conformability would simplify the production and reduce the cost of extensible backings, and would eliminate the variables of blade wear, critical moisture content, compressible roll composition, and roller speed differential associated with creped or otherwise mechanically roughened backings. Furthermore, a flatback backing requires less adhesive, barrier and release coating and provides an improved paint edge as well as improved adhesive properties.

SUMMARY OF THE INVENTION

The present invention is directed to an adhesive sheet that comprises (a) a non-creped flatback paper backing comprising cellulosic fibers and an elastomeric saturant and (b) an adhesive on at least a portion of at least one major surface of the backing. The backing has a high degree of extensibility as measured by its elongation at break of greater than 8% in the length (or the machine) direction (as measured using TAPPI standard test method T 949 om-88). The backing is not subjected to any mechanical means to improve extensibility or conformability.

The adhesive sheet of the invention may be prepared by coating an adhesive onto at least a portion of at least one major surface of the flatback paper backing. A primer may optionally be applied to the backing to help adhere the adhesive. When the adhesive is coated on only one side of the backing, a release coating may be used on the backing opposite the adhesive so that the sheet can be dispensed in roll form. A barrier layer may also be applied to the backing as a base for the release coating. A release liner may also be included to protect the adhesive surface.

In another embodiment, the invention provides an adhesive sheet having an elongation at break in the length (or machine) direction greater than 8%, preferably at least 10% and more preferably at least 12%. The sheet comprises (a) a non-creped flatback paper backing comprising cellulosic fibers and an elastomeric saturant and (b) an adhesive on at least a portion of at least one major surface of the backing. The backing has an elongation at break greater than 8% in the length or machine direction. The backing is not subjected to any mechanical means to improve extensibility or conformability.

In another embodiment, the present invention provides a method of masking a workpiece surface to facilitate painting a first area of the surface. This method includes applying the adhesive sheet of the invention to a second area of the surface.

In another embodiment, the invention provides a die-cut masking assembly comprising (a) at least one sheet of a non-creped flatback paper backing of a predetermined design or configuration wherein the backing comprises cellulosic fibers and an elastomeric saturant and has an elongation at break greater than 8%; (b) an adhesive coating on at least a portion of at least one major surface of said backing, and (c) a release liner to which the adhesive composition is releasably adhered, wherein no mechanical means is used to generate extensibility in the backing.

In still another embodiment, the invention provides a method of masking a workpiece surface to facilitate painting a first area of the surface using die-cut masking material of the invention.

The present invention provides an adhesive sheet and assembly that is extensible and conformable. Extensibility is herein defined as percent elongation at break in the length or machine direction. Conformability is herein defined as the ability to mask the inside circumference of a three inch diameter (7.6 cm) circle without tearing the tape as detailed hereinafter in Example 3.

The adhesive sheet of the present invention can be used for masking tapes, diaper frontal tapes, autoclave tapes, medical tapes, protective sheet coatings, labels for flexible containers, or any application where an extensible and conformable adhesive tape or sheet is required. The die-cut masking assembly is typically used in paint processes to mask curved, continuous surfaces. The adhesive sheet or assembly combines all the advantages of a smooth flatback tape with the extensibility and conformability of a creped or microcreped tape.

DETAILED DESCRIPTION OF THE INVENTION

The flatback paper backing employs a saturant that preferably has a glass transition temperature, $T_g$, below about −30° C., and more preferably below about −45° C. Suitable saturants include for example, synthetic or natural isoprene, styrene-butadiene rubber (SBR), acrylonitrile-butadiene rubber, acrylonitrile-butadiene-styrene rubber, crude rubber, acrylates, plasticized elastomers, or combinations of elastomers which provide suitable fiber slippage. A preferred saturant is a latex acrylic saturant.

Preferably, the paper used in the backing has a dry basis weight of between about 23 and 33 pounds per ream (37.5–54 g/m²), more preferably between about 25 and 30 pounds per ream (41–49 g/m$^2$), and most preferably about 28 pounds per ream (46 g/m$^2$). The paper may consist essentially of cellulosic fibers. Alternatively, it may contain other fibers, fillers, colorants and the like, such as are know in the art. The paper is coated with saturant to give a dry coating weight preferably greater than 25 parts by weight saturant per 100 parts by weight of the paper, more preferably from about 30 to about 75 parts by weight saturant per 100 parts by weight paper, most preferably from about 40 to 50 parts.

The average roughness of the backing, measured as a height and depth deviation from the center line average, is preferably less than about 7 μm for the non-creped backing of the present invention. Conventional creped masking tape backings have an average roughness of about 12 μm, and fine creped or microcreped backings can vary between about 3.5 and 7 μm, depending on the basis weight of the paper. In addition, the backing preferably has a tensile strength of about 18 lbs/inch (316 N/100 mm).

Generally, a backing elongation of break of at least 6–7% is required to provide a sheet, tape or assembly that is both extensible and conformable, but this level of elongation is not considered to be sufficient to mask intricate configurations. The elongation at break of the backing of the sheet of the present invention is greater than 8%. Preferably, the elongation at break of the backing is at least 10%, more preferably at least 12%.

The adhesive sheet or assembly of the present invention preferably has an elongation at break of greater than 8%. Preferably, the elongation at break of the sheet or assembly is at least 10%. This makes the sheet or assembly more conformable and enables one to mask intricate configurations with less tearing. It is even more preferred that the sheet or assembly has an elongation at break of at least 12%. This level of elongation at break enables one to mask intricate configurations with greater ease and virtually no tearing, thereby making the masking process easier to accomplish, more efficient and less costly.

Adhesives useful in the preparation of the tape and assembly of the present invention include pressure-sensitive and non-pressure sensitive adhesives, including solvent, heat, or radiation activated systems. Pressure sensitive adhesives (PSAs) are a preferred class of adhesives for use in the invention. PSAs are normally tacky at room temperature and can be adhered to a surface by the application of, at most, light finger pressure.

Useful adhesives may be based on compositions of polyacrylate; polyvinyl ether; diene-containing rubber (such as natural rubber, polyisoprene, and polyisobutylene); polychloroprene; butyl rubber; butadiene-acrylonitrile polymer; thermoplastic elastomer; block copolymers (such as the styrene-isoprene and styrene-isoprene-styrene block copolymers, ethylene-propylene-diene polymers, and styrene-butadiene polymer); poly-alpha-olefin; amorphous polyolefin; silicone; ethylene-containing copolymer (such as ethylene vinyl acetate, ethyl ethylacrylate, and ethyl methacrylate); polyurethane; polyamide; epoxy; polyvinylpyrrolidone and vinylpyrrolidone copolymers; polyesters; and mixtures of the above. A general description of useful pressure-sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

PSA compositions that are preferred for the adhesive sheet of this invention comprise an elastomeric component and a tackifier resin component, wherein the tackifier component is present in an amount of from about 20 to about 300 parts by weight, preferably about 50 to about 150 parts by weight, per 100 parts by weight of the elastomeric component. Preferred PSAs include, but are not limited to, acrylate or rubber resin elastomeric components, including both natural rubber and styrene-butadiene rubber (SBR), or mixtures of the same.

To form the adhesive sheet and assembly of the present invention, the adhesive can be applied to the backing by any method which results in transfer of the adhesive to, and retention thereof by, the backing. For example, the adhesive can be applied to the paper backing by solvent coating, emulsion coating out of water, hot melt coating, or any other suitable coating method. The adhesives may also be cured by any conventional method, including, for example, heat, e-beam or ultraviolet (uv) curing.

When the adhesive is coated on only one side of the backing, a release coat may be used on the backing opposite the adhesive so that the adhesive sheet can be dispensed in roll form. The release coating provides a surface which is not strongly adhered to by the pressure sensitive adhesive. Conventional pressure sensitive adhesive release coatings are based on long chain alkyl groups such as octadecyl isocyanate or octadecyl acrylate. Other release coatings comprise fluorocarbon, organo-silicone, silicone, polyvinyl chloride, polyamide or melamine materials. Release coatings are typically applied in the weight range of 0.01 to 2.0 grams per square meter of backing.

A barrier layer may be applied before applying the release coating. The barrier layer preferably imparts some solvent resistance to the coated backing. The barrier layer may comprise an elastomer having a glass transition temperature ($T_g$) from −5° C. to 75° C. Useful barrier layers include those that are based on acrylates, polyesters, styrene butadienes, styrene butadiene-acrylonitriles, melamines, polyamides or urea formaldehyde resins. The barrier layer is typically applied in the weight range of 2 to 10 grams per square meter of backing. Alternatively, a thermoplastic layer may be employed as a barrier layer. Representative examples of these materials include polyamide (such as nylon), and polyolefins (such as polypropylene, polyethylene, polybutylene, polybutadiene, poly-4-methylpentene and other polyolefins), polystyrene, polyester, copolyester, polyvinyl chloride, polyvinyl acetate, copolymers (such as ethylene/propylene copolymer, propylene/butylene copolymer, ethylene/propylene/butylene copolymer, ethylene/vinyl acetate copolymer, and ethylene/butyl acrylate copolymer), polymethyl methacrylate, thermoplastic rubber block copolymer, and blends and mixtures thereof.

A primer coating may be applied to the backing before applying the adhesive. Primer compositions may comprise natural rubber, SBR or neoprene rubbers, or mixtures thereof, blended with resins which are reactive and/or unreactive and filler. The primer coating is typically applied in the weight range of 2 to 7 grams per square meter of backing.

The thickness of the adhesive sheet is preferably less than 5 mils (.125 mm). Such a thin sheet provides an improved paint edge in masking application.

This invention is illustrated by the following examples, but the particular materials and amounts recited in these examples, as well as other conditions and details, should not be construed to unduly limit this invention.

EXAMPLES

Example 1

This example describes a pressure sensitive tape made from a rubber resin masking adhesive comprising about 50 parts by weight crude rubber; about 50 parts by weight styrene-butadiene rubber (SBR); about 60 parts by weight Sta-Tac-B™ tackifying resin, available from Reichhold Chemicals, Inc.; about 12.5 parts by weight zinc oxide; and about 1 part by weight Wingstay L™ antioxidant, available from Goodyear Tire & Rubber Company. The adhesive was vulcanized with a sulfur curative.

The adhesive was applied to a backing at a dry coating weight of about 8.7 grains/24 sq. in. (36.5 g/m$^2$).

CA360-046 paper, a saturated and barrier coated paper available from Monadnock Company, was employed as the backing. The CA360-046 paper had a dry basis of weight of 28 pounds per ream (46 g/m$^2$). The paper was saturated with an acrylic latex believed to contain polyethyl acrylate at a level of about 40 parts by weight per 100 parts by weight paper, to give a dry basis weight of about 40 pounds per ream (65 g/m$^2$). The paper was further coated with a barrier coating believed to contain polyethyl acrylate, polyamide resin, polyvinyl chloride, ester plasticizer, and nonyl phenoxy polyethyleneoxy ethanol wetting agent. This barrier coating brought the final dry basis weight of the backing to approximately 46 pounds per ream (75 g/m$^2$). The thickness of the backing was approximately 3.6–4.0 mils (0.09–0.1 mm) as measured using TAPPI standard test method T 411 om-84. The elongation at break of the backing was approximately 14% in the machine direction, and the tensile in the machine direction was approximately 18 lbs/inch (316 N/100 mm) as measured using TAPPI standard test method T 494 om88.

Adhesion values for the tape were determined as prepared and after dry heat aging for 16 hours at 150° F. (66° C.) according to ASTM standard test method D 3330-90 for peel adhesion of single-coated pressure sensitive tape at 180° angle. The adhesion values are given in Table 1.

TABLE 1

| Peel Adhesion at 180° Angle Rubber resin adhesive | | |
|---|---|---|
| | oz/in. | N/100 mm |
| Initial Tack | 62 | 68 |
| Dry Heat Aged | 58 | 64 |

Comparative Example 1

The same adhesive of Example 1 was coated onto a regular creped sheet identified as S-83884 available from Kimberly-Clark to give a dry coating weight of 8.9 grams/24 square inches (37.3 g/m$^2$). The S-83884 sheet is saturated with an acrylic binder and is sold for masking tape applications.

Adhesion values for the tape were determined according to Example 1 and are given below in Table 2.

TABLE 2

| Peel Adhesion at 180° Angle Rubber resin adhesive | | |
|---|---|---|
| | oz/in. | N/100 mm |
| Initial Tack | 46 | 50.4 |

TABLE 2-continued

| Peel Adhesion at 180° Angle Rubber resin adhesive | | |
|---|---|---|
| | oz/in. | N/100 mm |
| Dry Heat Aged | 41 | 44.9 |

A comparison of the data of Tables 1 and 2 shows that the adhesion values obtained for the tape of the present invention are higher than those of a comparable tape made with a creped paper backing.

Example 2

This example describes a pressure sensitive adhesive made from an acrylate adhesive comprising a copolymer of approximately 95.5% isooctylacrylate and 4.5% acrylic acid by weight. The adhesive was cast from heptane at about 35% solids onto the same smooth paper backing described in Example 1 to give a dry coating weight of about 6.5 grains/24 sq.in. (27 g/m$^2$).

Adhesion values for the tape were determined as in Example 1 and are given in Table 3.

TABLE 3

| Peel Adhesion at 180° Angle Acrylate adhesive | | |
|---|---|---|
| | oz/in. | N/100 mm |
| Initial Tack | 44 | 48 |
| Dry Heat Aged | 42 | 46 |

Comparative Example 2

The same adhesive as described in Example 2 was applied to a commercially available creped backing (S-83884 backing available from Kimberly-Clark) at two different dry coating weights, 6.0 grains/24 sq.in. (25.1 g/m$^2$) and 7.5 grains/24 sq.in. (31.4 g/m$^2$). Adhesion values for the tapes were determined as in Example 1. The results are given in Table 4.

TABLE 4

| Peel Adhesion at 180° Angle Rubber Resin Adhesive | | | | | |
|---|---|---|---|---|---|
| Coating Weight | | Initial Tack | | Dry Heat Aged | |
| grains/24 sq. in. | g/m$^2$ | oz./in. | N/100 mm | oz./in. | N/100 mm |
| 6.0 | 25.1 | 24 | 26.3 | 22 | 24.1 |
| 7.5 | 31.4 | 32 | 35 | 31 | 33.9 |

A comparison of the data of Tables 3 and 4 shows higher adhesion values may be obtained with the tape of the present invention as compared to tapes comprising a creped paper backing. The 6.5 grain/24 sq.in. (27 g/m$^2$) tape of Example 2 gave an initial tack adhesion value of 44 oz/in (48 N/100 mm) and a dry heat aged adhesion value of 42 oz/in (46 N/100 mm). These values are higher than those obtained from the tapes comprising a comparable adhesive coated onto creped backing at dry coating weights of 6.0 grains/24 sq.in (25.1 g/m$^2$) and 7.5 grains/24 sq.in. (31.4 g/m$^2$).

Example 3

The 46 pound (75 g/m$^2$) barrier coated, non-creped extensible paper backing of Examples 1 and 2 (identified as "Monadnock" in Table 5) and five other paper backings were tested to compare tensile, elongation, caliper, average surface roughness (Ra) and conformability. The five backings are described as follows:

Thilmany XKL is a microcreped or fine creped paper available from Thilmany Pulp and Paper Company. Two different basis weights of the Thilmany paper, 28 and 40 pounds per ream (46 and 65 g/m$^2$), were tested.

KC S-46604 and KC 6750-CE are saturated paper backings available from Kimberly-Clark Corporation. KC S-46604 is a 40 pound per ream (65 g/m$^2$) conventional creped styrene-butadiene rubber saturated paper backing, and KC 6750-CE is a 44 pound per ream (72 g/m$^2$) uncreped flatback acrylic saturated paper backing.

Potsdam MG is a 35 pound per ream (57 g/m$^2$) machine glazed flatback paper available from Potsdam Paper Mill, Inc. In general, a "glazed" paper is dried on a highly polished drum which imparts the "glazed" surface on the side of the paper in contact with the drum.

The tensile and elongation at break in the lenght or machine direction of the six backings were tested according to TAPPI standard test methods T 494 om-88, and the calipers were measured according to TAPPI standard test method T 411 om-84. The average surface roughness (Ra) in μm was measured for both sides of each backing as an average deviation from mean using laser profilometry.

The backings were coated with a rubber resin masking adhesive comprising about 50 parts by weight crude rubber, about 50 parts by weight styrene-butadiene rubber (SBR), about 60 parts by weight Sta-Tac-B™ tackifying resin available from Reichhold Chemicals, Inc., about 12.5 parts by weight zinc oxide, and about 1 part by weight Wingstay L™ antioxidant, available from Goodyear Tire & Rubber Company. The adhesive was vulcanized with a sulfur curative. The adhesive was applied to each backing to provide a final dry coating weight of about 8.7 grains/24 sq.in. (36.5 g/m$^2$), and each tape was tested for conformability.

Conformability was measured by the ability to mask the inside circumference of a three inch (7.6 cm) diameter circle without tearing. The procedure for measuring conformability was as follows:

The tape and a heat-cured painted steel panel having a 3 inch (7.6 cm) diameter circle printed thereon were conditioned overnight at 72° F. (22° C.) and 50% relative humidity. The testing was carried out in an environmentally controlled room at these same conditions. A starting tab of the tape was grasped with the fingers of one hand, and the tape was unrolled to a distance of approximately one foot. The tape was applied to the inside circumference of the circle on the panel by fastening the starting tab at one point and slowly curving the tape with one hand while pressing down the tape edge against the circle with the thumb of the other hand so as to conform the tape as closely as possible to the curvature of the circle. The tape roll was held so that the unwinding tape made approximately a 30° angle with the panel surface and was kept extended to a distance of approximately one foot from the panel throughout the application. A slight outward pressure was applied as the tape was unwound from the roll so that there was always tension on the tape. The process was continued around the circle until the entire inner circumference of the circle was masked.

The object of the test was to apply the tape as closely as possible to the inside circumference of the circle, maintaining a smooth circle design without tearing the tape edge. A break in the circle of tape indicated that the tape was less conformable than required. Four trials were run on each tape. If more than one of the four trials resulted in a break, the tape was judged to be nonconformable. The results of this test, as well as those for tensile, elongation and surface roughness, are given in Table 5.

TABLE 5

| | | Physical Properties of Backings | | | | | | | | |
|---|---|---|---|---|---|---|---|---|---|---|
| | | Basis Wt. | | Tensile | | Elongation | Caliper | | Ra | |
| Sample | Side | (lbs/ream) | (g/m$^2$) | (lbs/in.) | (N/100 mm) | (%) | (mil) | (mm) | (μm) | Conformable |
| Monadnock | Barrier | 46 | 75 | 17.4 | 305 | 15.4 | 4.0 | 0.10 | 6.32 | yes |
| | Non-Barrier | | | | | | | | 5.67 | |
| Thilmany XKL | Crepe | 28[1] | 46 | 7.2 | 126 | 6.6 | 2.7 | 0.07 | 3.65 | no |
| | Non-Crepe | | | | | | | | 4.79 | |
| Thilmany XKL | Crepe | 40[1] | 65 | 19.2 | 336 | 14.0 | 4.3 | 0.11 | 6.99 | yes |
| | Non-Crepe | | | | | | | | 4.02 | |
| KC S-46604 | Crepe | 40 | 65 | 21.2 | 371 | 12.0 | 6.0 | 0.15 | 9.96 | yes |
| | Non-Crepe | | | | | | | | 8.95 | |
| KC 6750 CE | Barrier | 44 | 72 | 48.9 | 856 | 4.2 | 4.4 | 0.11 | 5.57 | no |
| | Non-Barrier | | | | | | | | 6.73 | |
| Potsdam MG | Glazed | 35[1] | 57 | 10.0 | 175 | 2.0 | 3.4 | 0.09 | 2.75 | no |
| | Non-Glazed | | | | | | | | 6.71 | |

[1]Note: the paper indicated is not saturated and therefore has a lower basis weight than for a comparable saturated paper Results The Monadnock paper used as a backing in the tape of the present invention exhibited excellent tensile and elongation and provided a conformable tape while possessing the thin caliper and surface smoothness characteristic of a flatback.

The fine creped 28 pound per ream (46 g/m$^2$) backing from Thilmany had excellent surface smoothness and caliper, but the elongation and tensile were too low for use in many masking applications. The higher basis weight fine creped Thilmany paper showed significant improvement in tensile, elongation and conformability, but the higher weight paper costs more and is thicker and stiffer, giving a boardier feel to tape made from the paper.

Backing KC S-46604 exhibited excellent tensile and elongation, but the caliper and surface roughness were higher than the other paper backings. Backing KC 6750 CE showed extremely good tensile, but low elongation and poor conformability so that it could not be used for many masking applications. The glazed flatback paper from Potsdam had poor tensile as well as low elongation and poor conformability.

Only the tape of the present invention provides a thin, conformable tape having a smooth surface and good physical properties (tensile and elongation), wherein no mechanical means has been applied to the backing.

What is claimed is:

1. An adhesive sheet, comprising:
   (a) a non-creped flatback paper backing comprising cellulosic fibers and an elastomeric saturant and having an elongation at break of at least 10% and
   (b) an adhesive coating on at least a portion of at least one major surface of said backing,
   wherein no mechanical means is used to generate extensibility or conformability in said backing.

2. The sheet of claim 1 wherein the $T_g$ of said saturant is less than −30° C.

3. The sheet of claim 1 wherein the $T_g$ of said saturant is less than −45° C.

4. The sheet of claim 1 wherein the average surface roughness of said backing is less than about 7 μm.

5. The sheet of claim 1 wherein said saturant is a latex acrylic saturant.

6. The sheet of claim 1 wherein said adhesive is selected from the group consisting of polyacrylate; polyvinyl ether; polychloroprene; butyl rubber; butadiene-acrylonitrile polymer; thermoplastic elastomer; block copolymer; poly-alpha-olefin; amorphous polyolefin; silicone; ethylene-containing copolymer; polyurethane; polyamide; epoxy; polyvinylpyrrolidone and vinylpyrrolidone copolymer; polyesters; and mixtures of the above.

7. The sheet of claim 1 wherein said paper backing further comprises a barrier layer on at least one major surface.

8. The sheet of claim 1 further comprising a release coating on said paper backing opposite said adhesive coating.

9. The sheet of claim 1 wherein said adhesive coating is a pressure sensitive adhesive.

10. The sheet of claim 1 wherein said paper backing consists essentially of cellulosic fibers.

11. The sheet of claim 10 wherein said paper backing has an elongation at break of at least 12%.

12. The sheet of claim 9 having an elongation at break of at least 12%.

13. A method of masking a workpiece surface to facilitate painting a first area of the surface, said method comprising applying an adhesive sheet according to claim 1 to a second area of the surface.

14. A die-cut masking assembly comprising:
   (a) at least one sheet of a non-creped flatback paper backing of a predetermined design or configuration wherein said paper backing comprises cellulosic fibers and an elastomeric saturant and has an elongation at break greater than 10%;
   (b) an adhesive coating on at least a portion of at least one major surface of said paper backing, and
   (c) a release liner to which the adhesive composition is releasably adhered,
   wherein no mechanical means is used to generate extensibility in the backing.

15. A method of masking a workpiece surface to facilitate painting a first area of said surface, said method comprising applying a die-cut masking assembly according to claim 14 to a second area of said surface.

16. A method of making an adhesive tape comprising coating an adhesive onto at least a portion of at least one side of a non-creped flatback paper backing containing an elastomeric saturant and having an elongation at break greater than 10%, wherein no mechanical means is used to generate extensibility in the backing.

* * * * *